April 30, 1963 J. A. SOMER 3,087,988

SIMULATED STEREOPHONIC SOUND TRANSLATING AND RECORDING SYSTEM

Filed Jan. 28, 1960 2 Sheets-Sheet 1

INVENTOR.
JACK ARTHUR SOMER
BY Eugene M. Whitacre
ATTORNEY

INVENTOR.
JACK ARTHUR SOMER
BY
Eugene M. Whitacre
ATTORNEY

United States Patent Office 3,087,988

Patented Apr. 30, 1963

3,087,988

SIMULATED STEREOPHONIC SOUND TRANSLATING AND RECORDING SYSTEM

Jack A. Somer, New York, N.Y., assignor to Radio Corporation of America, a corporation of Delaware Filed Jan. 28, 1960, Ser. No. 5,199
19 Claims. (Cl. 179—1)

The present invention relates generally to sound or audio-frequency signal translating systems, and has for its primary object to provide an effective and wide-range system for translating monophonic or single-channel sound signals into simulated stereophonic two-channel sound signals for recording and reproduction in stereophonic form.

The present invention relates, more particularly, to stereophonic sound recording systems for the production of magnetic tape and phonograph disc recordings, and has for its further object to provide an improved system of this type for producing simulated two-channel stereophonic sound recordings from single-channel monophonic sources, and without detriment to the original monophonic sound in said stereophonic recordings.

As is known, stereophonic sound translating systems, for either recording or reproducing, involve the use of two stereophonically-related audio-frequency sound signals, such as may be derived from two laterally-spaced, left and right, microphones at the original sound source of the program or recording material. These two signals are translated and recorded through separate A and B signal channels on magnetic tape or phonograph master records from which later tape and phonograph-record reproductions are made for commercial use.

True stereophonic reproduction of sound is accomplished only by true stereophonic recording with multiple microphone and signal channel means directly from the original sound source. However, there are many existing sound recordings on both magnetic tapes and phonograph records that were made in single-channel or monophonic form, and are of sufficient present interest or value, to warrant their reproduction in more modern stereophonic or two-channel form. This is particularly true of many important musical works that have been made in the past by famous orchestras, choirs and groups of artists, which can no longer be assembled for the same recording stereophonically today. Such musical works may have great historical, technical or artistic value that would considerably be enhanced if they could be made available in stereophonic form.

It is, therefore, a further object of this invention to provide an improved system for deriving or translating from any wide-range single-channel or monophonic sound signal source, such as monophonic sound recordings on magnetic tape or phonograph-record masters and the like, corresponding simulated two-channel stereophonic sound signals for recording on magnetic tape or phonograph record means and further reproduction as simulated stereophonic sound.

Simulated stereophonic recordings with greatly enhanced sound or musical content may thereby be made from many original monophonic sound sources for better use and enjoyment on the stereophonic record and tape playing equipment now available and in extensive use commercially. Advantage may thus be taken of the desirable feeling of "presence" afforded by the resulting effectively stereophonic sound reproduction.

It is also an object of this invention to provide an improved method and means for converting or translating a single-channel or monophonic signal from a monophonic signal source into a highly-simulated two-channel stereophonic signal corresponding to and substantially duplicating the source signal in stereophonic form.

In accordance with the invention, to produce a simulated stereophonic effect from a single-channel signal source, the derived monophonic signal may be considered broadly to be divided into two distinct channel A and B signals which as closely as practicable may resemble the two stereophonically-related sound signals that would be recorded in a two-channel true stereophonic recording of the original sound source.

It is recognized that the stereophonic effect is produced by two essential elements, namely, direct and reverberant sound. In a true stereophonic recording, the direct sound is picked up by each microphone from sound sources near it to constitute the main channel signals. Both microphones pick up some direct sound from all of the other and more distant sound sources contributing to the program material. The level or amplitude and the delay in the sound which reaches the microphones depends upon their relative distances from the sound sources. Also the reverberant sound from all sound sources is picked up by both microphones. This pickup depends upon the acoustical qualities of the recording studio or area, and does not necessarily follow a definite pattern like the direct sound. Both microphones thus pick up the total sound, and both receive reverberant sounds from all sources in no definite time or intensity relation.

It is also recognized that the individual sound sources, such as the instruments of an orchestra or the voices in a choral group, are always arranged in some definite spatial relation to each other that is known or may be determined with reasonable accuracy. For example, in an orchestra, the higher pitched instruments are often located generally to the left and the lower pitched instruments are located generally to the right of center. Likewise, in a choral group, the tenor and soprano voices are often located generally to the left and with the bass and alto voices located generally to the right of center.

The individual sound sources represented in a monophonic sound signal or monophonic recording thus fall generally into different frequency bands that, in accordance with the invention, are utilized to effectively simulate their original spatial relation in the stereophonic reproduction. Accordingly, the division of the monophonic sound signal, above referred to, is effected mainly by filtering into two or more signals in different frequency bands generally representative of the original spatial relation of the individual sound sources. These frequency-band signals are allocated or applied, at controlled levels or amplitudes, to the appropriate left and right, or A and B, stereo channels provided for the stereo reproduction, to simulate this same spatial relation or source localization in the reproduced sound. Broadly, the overall frequency spectrum of the original monophonic signal is divided by filtering for proper sound source localization in the two stereo signal channels.

The frequency spectrum of each stereo channel is further controlled or shaped by added signal components, including both direct and echo (reverberant) signal components, at different controlled levels or amplitudes thereby to further localize certain of the major sound sources in the repoduction more effectively, and to increase the spatial effect to substantially equal that of a true stereophonic recording.

A sound recording system for the effective duplication of monophonic single-channel recordings in stereophonic two-channel form, in accordance with the invention, thus includes the following main or basic circuit or operational elements:

(1) Filter means to divide the single-channel signal into two signals including frequency bands corresponding to, or which would be included in left and right, or channel A and B, signals of true stereophonic recording thereof.

(2) Means for adding direct signal components derived from the monophonic signal to each stereophonic signal channel.

(3) Means for adding similarly derived echo or reverberation signals, both in full-frequency range, and filtered or divided, to each stereophonic signal channel.

(4) Means for controlling all of the signal components in amplitude or level, thereby to proportion their relative amplitudes in the final output signals in the two stereophonic signal channels.

These elements of the system are co-ordinated and connected to derive from the total monophonic signal four basic signal components for each channel which provide a complete simulated stereophonic signal for re-recording or reproduction. These four basic components of the stereophonic signal in each channel are as follows:

(1) A controlled-level main signal in one or more finite frequency bands. This is the filtered or divided direct signal.

(2) A controlled-level full-frequency direct signal.

(3) A controlled-level full-frequency echo signal.

(4) A controlled-level filtered or divided echo signal. This last signal component may be a low-frequency echo signal added to one channel and/or a high-frequency echo signal added to the other channel. Preferably, as will be shown, an attenuated cross echo signal from each derived stereo channel may be applied to the other for the same purpose.

In operation, the basic signal elements referred to are controlled and proportioned, generally by subjective listening to the overall resultant simulated stereophonic signals, to effectively duplicate the monophonic signal or recording in stereophonic form. The filter means serve to establish a pattern of signals whose levels are changed to accomplish the desired stereo effect. It is found that the filter settings or response characteristics (band-width) on direct signal, and the attenuator or level settings, are effective to separate or localize the left and right hand, or channel A and B, sound sources. The level settings of the filtered signals, however, mainly determine the localization of different sound sources.

The filter settings or response characteristics (bandwidth) on echo signals are made to present the fullest sound spectrum without changing the localization of desired sound sources, and the level settings of the echo signals are such as to keep the sound picture broad but not to interfere with the localization of desired sounds or to introduce overly reverberant sound into either channel. Broadly, the resultant stereophonic signals are produced by the controlled use of the two essential elements of any true stereophonic recording as previously referred to, namely, direct sound and reverberant sound.

The invention will however be further understood from the following description of a specific embodiment thereof, when considered with reference to the accompanying drawings, and its scope is pointed out in the appended claims.

Referring to the drawings.

Figure 1:
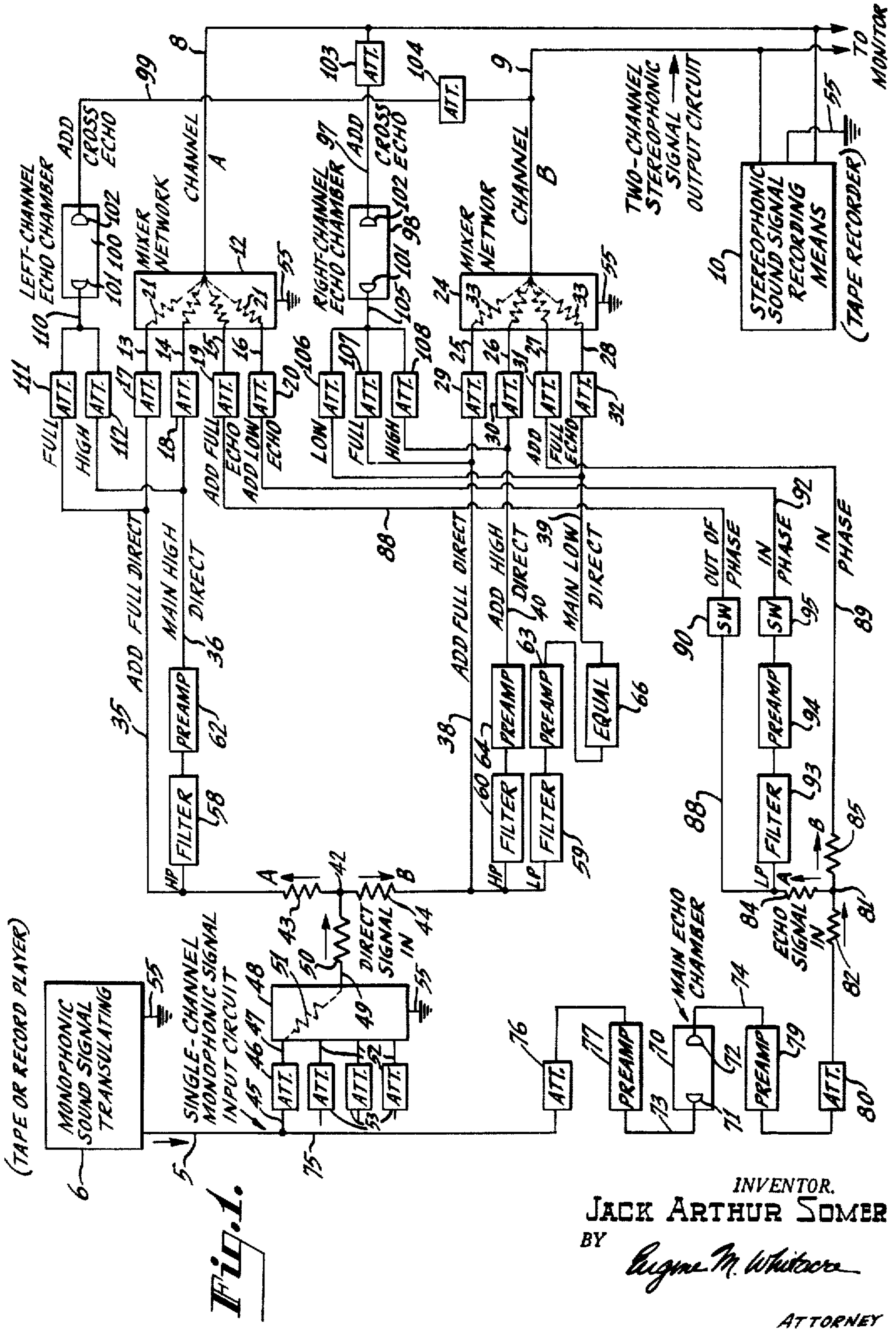
FIGURE 1 is a schematic circuit diagram, in block form, showing a simulated stereophonic sound translating and recording system embodying the invention.

Referring to the drawings and particularly to FIGURE 1, a signal-channel monophonic signal input circuit 5 is provided, to which may be connected any suitable source of monophonic sound signals such as monophonic sound signal translating means 6. This may be a tape or record player, as indicated, for deriving or translating from any wide-range monophonic sound recording on a magnetic tape or phonograph record, a corresponding monophonic signal that is desired for recording and reproduction as simulated stereophonic sound for purposes hereinbefore discussed.

The system is further provided with a two-channel stereophonic signal output circuit which includes a left, or channel A, output circuit 8 and a right, or channel B, output circuit 9. This two-channel output circuit is adapted to be connected to any stereophonic signal utilization means, such as stereophonic sound signal amplifying, reproducing or recording means. In the present example it is shown connected to recording means such as a tape recorder, as indicated.

Each signal channel output circuit is connected with a signal mixer network having several input circuits provided with individual attenuator means. In this way, a number of different signal components may be mixed and applied to the channel output circuits in adjusted or controlled amplitude relation thereby to provide, as a resultant composite signal, the desired simulated stereophonic output signal. In the present example, the left signal channel A circuit 8 is connected to a signal mixer network 12 having four signal input circuits 13–16 provided with input signal attenuators or attenuator means 17–20, respectively. As indicated schematically by the dotted line resistance elements 21 connected between the input circuits 13–16 and the channel output circuit 8, the mixer network provides suitable internal circuitry for isolating the input circuits from the output circuit and one from another and for signal conduction and mixing into the output circuit, which is thus common to all the input circuits.

Likewise, the right channel B output circuit 9 is connected to a similar signal mixer network 24 having four individual input circuits 24–28 and corresponding individual attenuators or attenuator means 29–32, respectively. This network, like the network 12, provides signal mixing from each of the individual input circuits to the output circuit through the internal network circuitry represented by the dotted-line resistors 33. These represent the internal circuitry, as in the network 12, for isolating the input circuits from the output circuit and from one another, while providing signal conduction and mixing into the output circuit 9.

Between the signal channel output circuits 8 and 9 and the signal input circuit 5, a plurality of direct signal conveying circuits are provided. At least one of these circuits to each output circuit includes variable high and/or low-pass filter means, and each of these circuits includes signal attenuator means. The filter means have different pass-band characteristics and divide the frequency spectrum of the input signal into different frequency bands for effective signal channel separation. As explained hereinbefore, the filter means is designed to divide the single-channel monophonic signal into frequency bands corresponding to, or which would be included in, left and right, or A and B channel signals of a true stereophonic recording thereof.

In the present example, two direct signal conveying circuits 35 and 36 are connected to the input circuits 13 and 14 of the mixer network 12, and thus to the channel A output circuit 8, through the attenuators 17 and 18 respectively. Two corresponding direct signal conveying circuits 38 and 39 are likewise provided for the channel B output circuit 9. These are connected respectively with the input circuits 25 and 28 of the mixer network 24, and thus to the channel B output circuit 9, through the corresponding input attenuators 29 and 32. In addition, for channel B, a third direct signal conveying circuit 40 is provided in connection with the input circuit 26 of the mixer network 24 through the attenuator 30.

All of these direct signal conveying circuits are connected to a common direct signal supply terminal 42, the circuits 35 and 36 for channel A being connected thereto through a series isolating resistor 43, and the circuits 38, 39 and 40 for channel B being connected thereto through a series isolating resistor 44. These circuits thus operate in parallel relation to convey direct signals from the terminal 42 to the channel output circuits 8 and 9 through the respective attenuators and signal mixer networks.

The direct signal input to the supply terminal or distribution point 42, from the single-channel input circuit 5, is provided by a branch circuit 45 connected between the circuit 5 and the terminal 42 and including a suitable attenuator 46 and one channel or input circuit 47 of a signal mixer network 48, the output circuit 49 of which is connected to the terminal 42 through a third isolating resistor 50. The signal path through the mixer network 48 is represented by the dotted resistor 51 and provides for the direct signal flow from the input circuit 47 to the output circuit 49 as in the other mixer networks 12 and 24.

The network 48 and the attenuator 46 is shown only by way of example as being practical and convenient to use, for the reason that such control means are generally available in standard recording studio equipment which may provide several banks of mixer networks and attenuators. In this case, the additional input circuits 52 and attenuators 53 of the network 48 are not used for signal channel separation. Also the network 48 and its input attenuators are shown in the present location apart from the others, for the purpose of simplifying the circuit diagram.

It will further be noted that the mixer networks 12, 24 and 48 are provided with circuit connections 55 to chassis or system ground, as are also the signal input and output circuits, respectively at the monophonic signal source 6 and at the stereophonic signal utilization means 10. All of the single-line signal circuits shown in the circuit diagram, therefore, may be considered to have a return path or circuit connection through the usual chassis or system ground means represented by the ground connections 55. Others are not shown to simplify the circuit diagram and to make the signal conveying circuits easier to follow.

The resistor network 43—44—50 represents any suitable means for effecting channel separation of the input monophonic signal into two signals for channels A and B. It also provides isolation with respect to the common direct signal supply or input terminal 42, and likewise for isolating and impedance matching the input circuit network 48. With this circuit arrangement, it will be seen that a monophonic signal applied to the input circuit 5 is conducted through the direct signal branch circuit 45 and the attenuator 46 to the supply terminal 42 from which it is divided and conducted in separate paths through the resistors 43 and 44 to the parallel-connected direct signal conveying circuits 35 and 36 for channel A on the one hand, and to the parallel-connected direct signal conveying circuits 38, 39 and 40 for channel B on the other hand.

As indicated by the legend on the circuits 35 and 38, the full direct monophonic signal component or full-frequency signal is added to each output channel through these circuits, under control of the attenuators 17 and 29 for adusting the relative amplitudes and effect at the output circuits 8 and 9. The output signals in the channel A and B output circuits, 8 and 9, thus may include some of the full-frequency direct signal in controlled amounts or amplitudes.

The direct signal conveying circuits 36, 39 and 40 include series filter elements 58, 59 and 60 respectively. For the translation of monophonic sound signals representative of orchestra music and the multiple sound sources thereof, these filter elements are of the wide band type, of which the filter elements 58 and 60 are high-pass filters and the filter element 59 is a low-pass filter. This will generally be the case for the simulated stereophonic reproduction of orchestral and choral music since it is readily understood that the left channel A signal may be predominantly in a higher frequency range or band, and the right channel B may be predominantly in a lower frequency range or band, for true stereophonic recordings thereof.

With this circuit arrangement, an attenuated main direct signal in one or more finite frequency bands is added to the stereophonic signal channel output circuits. This is the filtered or divided direct signal which has been discussed hereinbefore as the basic simulated sterophonic signal. For channel A, this signal is conveyed through the filter element 58 and the signal conveying circuit 36, from the supply terminal 42, and applied to the output circuit 8 through the attenuator 18 and the input circuit 14 of the mixer network 12, for mixing with the full direct signal applied through the input circuit 13.

In the present example, it may be considered that the pass-band of the filter element 58 passes signals in the upper end of the useful sound spectrum, from any lower frequency up to the high-frequency end thereof which may be taken as a practical example, to be approximately 15,000 cycles. As will be explained hereinafter, the low frequency end of the passband may, in some cases be extended downwardly as far as 200 cycles or even lower, for orchestral and choral music recording and reproduction.

For channel B, the filtered or divided direct signal is conveyed through the filter element 59 and the circuit 39 from the supply terminal 42, and is applied to the output circuit 9 through the attenuator 32 and the input circuit 28 of the mixer network 24 for mixing with the full direct signal applied through the input circuit 25. In the present example, it may also be considered that the pass-band of the filter element 59 is at the lower end of the useful audio frequency sound spectrum extending from any higher-frequency upper limit down to 30 cycles for example. As will also be explained hereinafter, the high frequency end of this pass-band may be extended upwardly as far as 2500 cycles, or even higher, for orchestral and choral musical recording and reproduction.

To balance the main low-frequency signal or signal component thus applied to channel B, a further filtered or divided direct signal may be added. This is conveyed through the filter element 60 and the circuit 40 from the supply terminal 42, and is applied to the channel B output circuit 9 through the attenuator 30 and the input circuit 26 of the mixer network 24, for mixing with both the full direct signal applied through the input circuit 25, and the main low-frequency filtered direct signal applied through the input circuit 28.

In the present example, it may be considered that the pass-band of the filter element 60 is such that it passes signals in the upper end of the sound signal spectrum from any lower frequency limit such as 2,000 cycles, for example, to the upper limit which may, for practical purposes, be taken presently to be 15,000 cycles, as referred to above.

From the foregoing description it will be seen that two of the four basic components of the stereophonic signal in each output channel are provided by the above described circuit arrangement. These are the attenuated full-frequency direct signal variably applied to each output channel, and the attenuated main signal in one or more finite frequency bands also variably applied to each output channel. The latter includes the relatively high-frequency signal band applied to the left or channel A output circuit 8, the relatively low-frequency signal band applied to the right or channel B output circuit 9, and the added high-frequency signal band added to the channel B output circuit 9. As explained hereinbefore, these give the stereophonic effect to the output channel signals in that they provide sound source localization effectively to the left and right of the center in the final reproduced sound therefrom.

Because of the signal attenuation that may result from the use of certain types of series filter elements 58, 59 and 60 feeding directly into the attenuators in the various signal conveying circuits as above described, it is desirable in some cases to provide signal amplifiers following the filtering. This is provided in the system of the present example wherein suitable preamplifiers 62, 63 and 64 are connected respectively in the signal conveying circuits 36, 39 and 40 following the filter elements therein. These preamplifiers serve to restore the signal level or amplitude where necessary and match into the low impedance of the controlling attenuators 18, 32 and 30.

Further control of the frequency response range and the signal amplitude in the filtered signal conveying circuits may be provided by suitable equalizers inserted serially therein, as is shown, for example, in the main low-frequency direct signal circuit 39, wherein an equalizer 66 is connected to follow the preamplifiers 63 serially in the circuit. With this arrangement, the shape of the low-frequency response at the channel B output circuit 9 may be changed as desired.

The remaining two of the four basic components of the stereophonic signal to be provided in each output channel are thus the attenuated full-frequency reverberation or echo signal and the attenuated filtered or divided reverberation or echo signal. As pointed out hereinbefore, these latter signal components may be a low-frequency echo signal added to one channel output circuit and/or a high frequency echo signal added to the other channel output circuit. Preferably, an attenuated cross-echo signal from each derived stereo channel signal may be applied to the other as will hereinafter be described.

Considering first the addition of the main full frequency direct reverberation or echo signal and the main filtered or divided echo signal, with reference to the circuits shown in FIGURE 1, the basic reverberation or echo signal therefor is derived through the use of an echo chamber 70 or other delay means of any suitable construction which will also give a predetermined decay characteristic. Ordinarily this may comprise an elongated closed sound chamber, such as a large room, having an input sound-signal transducing device 71 at one end and an output sound-signal transducing device 72 at the opposite end, as schematically shown in FIGURE 1, to translate applied sound signals from an input circuit 73 connected to the device 71, to an output circuit 74, connected to the device 72, with a predetermined signal decay and time delay. In the present example, the transducer device 72 may be considered to be a microphone and the transducer device 71 may be considered to be a loudspeaker. As such echo-chambers are well known and understood, further description is believed to be unnecessary.

The echo chamber 70 is connected to receive monophonic signals from the same source as the direct signals, which in this case is the input circuit 5. This includes an echo-signal branch circuit 75 from the circuit 5, which is connected through a suitable attenuator 76 and a preamplifier 77 to the input circuit 73 of the echo chamber 70. The output circuit 74 of the echo chamber is connected through a second preamplifier 79 and an attenuator 80 to an echo-signal supply terminal 81 having a suitable series isolating resistor means 82. Further, as in the case of the direct signal distribution, the input echo signal is divided into two signals and distributed initially to the two channel A and channel B output circuits through individual branch isolating resistors 84 and 85.

The channel A isolating resistor 84 is connected through an echo-signal conveying circuit 88 to the attenuator 19 and the input circuit 15 of the mixer network 12 for the channel A output circuit 8. The channel B isolating resistor 85 is connected through a second echo signal conveying circuit 89 to the attenuator 31 and the input circuit 27 of the mixer network 24 for the channel B output circuit 9. A reversing or phasing switch 90 is connected in the echo-signal conveying circuit 88 for applying the echo-signal component therethrough in out-of-phase relation to the other echo-signal component in the output signal 8, to enhance the stereophonic effect in certain cases, as will be explained hereinafter. Attenuated full-frequency echo signals may thus be added to both signal output channels through the signal conveying circuits 88 and 89.

In some cases, filtered or divided echo signals may be added to both output channels. In the present example, a single low-frequency echo signal is added to one channel only, this being the high-frequency or left channel, channel A output circuit 8. For this purpose, a third echo signal conveying circuit 92 is provided between the output end of the channel A isolating resistor 84 and the attenuator 20 for the input circuit 16 of the mixer network 12 for the channel A output circuit 8. The echo signal conveying circuit 92 includes a series filter element 93 followed by a preamplifier 94 and a reversing or phasing switch 95 for controlling the flow of echo signals to the channel A output circuit. In the present example, the filter element 93 may be considered to be a low-pass filter for signal frequencies in the low end of the audio-frequency sound spectrum. This may provide a low-frequency balance on the sound spectrum of the left channel A stereophonic signal, as well as echo or reverberation. The preamplifier 94 restores the signal amplitude of the filtered echo signal if necessary and provides effective impedance matching. The phasing switch 95 may be set for in-phase or out-of-phase application of the filtered echo signal to the output circuit. In the present example it may be considered to be set for in-phase operation while the phasing switch 90 is set for out-of-phase operation.

The echo signal conveying circuit 92 provides an added low-frequency echo signal component for the high frequency channel A. In a similar manner, a high-frequency echo signal component may be added to the low-frequency channel B for effecting an enhanced stereophonic sound effect in some cases. However better control and results have been attained by the alternative use of attenuated cross-echo signals from one signal channel to the other as further shown in the present example.

If the cross echo signal technique is used, the filtered echo signals may not be desirable, because the cross-echo signals have equalization inherent in choice of feeder attenuation. Furthermore, it may be noted that when filtered echo signals are used, they may be as replacement for the cross echo signals, and should preferably utilize two echo chambers different from the direct full frequency echo chamber.

Generally the filtered or cross echo signals should have shorter delay and decay times than the direct, because the filtered or cross echo signals simulate delayed direct pickup of the sound sources and the direct full frequency (antiphase) echo signals simulate general room or studio reverberation.

Referring to the output circuits 8 and 9, it will be seen that in accordance with the foregoing consideration of the cross echo system, the channel A output circuit 8 is connected with an output circuit 97 from a right-channel echo chamber 98 and the channel B output circuit 9 is connected with an output circuit 99 from a left-channel echo chamber 100. These echo chambers represent any suitable reverberation signal translating means. In the present example they may be considered to be of a smaller construction than the echo chamber 70, but having an input transducer or loudspeaker unit 101 and an output transducer or microphone unit 102 or the like, spaced apart in opposite ends as indicated, to give a shorter delay and decay time than the direct echo chamber 70. A suitable attenuator is included in each of the echo chamber output circuits 97 and 99 as indicated at 103 and 104, respectively.

The input circuit 105 for the echo chamber 98 is branched, either through a suitable mixer network, or directly connected as shown, to three separate attenuators 106, 107 and 108 which in turn are connected, respectively, with the main low-frequency direct signal conveying circuit 39, the full-frequency direct signal conveying circuit 38, and the high-frequency direct signal conveying circuit 40, for channel B supply. Low, full and high-frequency signal components, in any desired or predetermined amplitude relation, may thus be applied through the attenuators 106–108 to the echo chamber 98, from the channel B direct signal supply and added as a cross-echo signal, through the output circuit 97, to the channel A output circuit 8. This effectively provides cross reverberation from channel B to channel A, for enhancing the frequency response of the channel A signal and the reverberation characteristics thereof.

In a similar manner, the input circuit 110 for the echo chamber 100 is branched and connected through attenuators 111 and 112, respectively, with the full-frequency direct signal supply circuit 35 and the main high-frequency signal supply circuit 36, for channel A. By this means full-frequency and high-frequency signal components, suitably attenuated and related in amplitude, from channel A may be applied to the echo chamber 100, and as a cross echo signal through the output circuit 99 may be applied to the opposite channel B output circuit 9, likewise for enhancing the frequency response of the channel B signal and the reverberation characteristics thereof.

Figure 2:
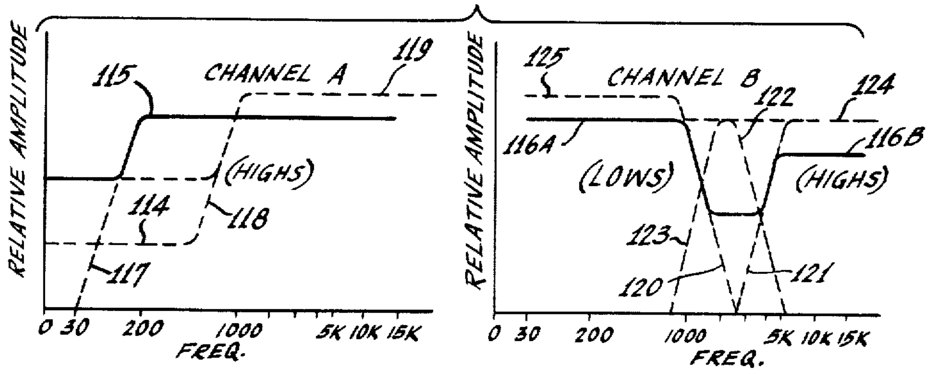
FIGURE 2 is a graph showing curves indicating certain frequency response characteristics of the sound translating and recording system of FIGURE 1.
Figure 3:
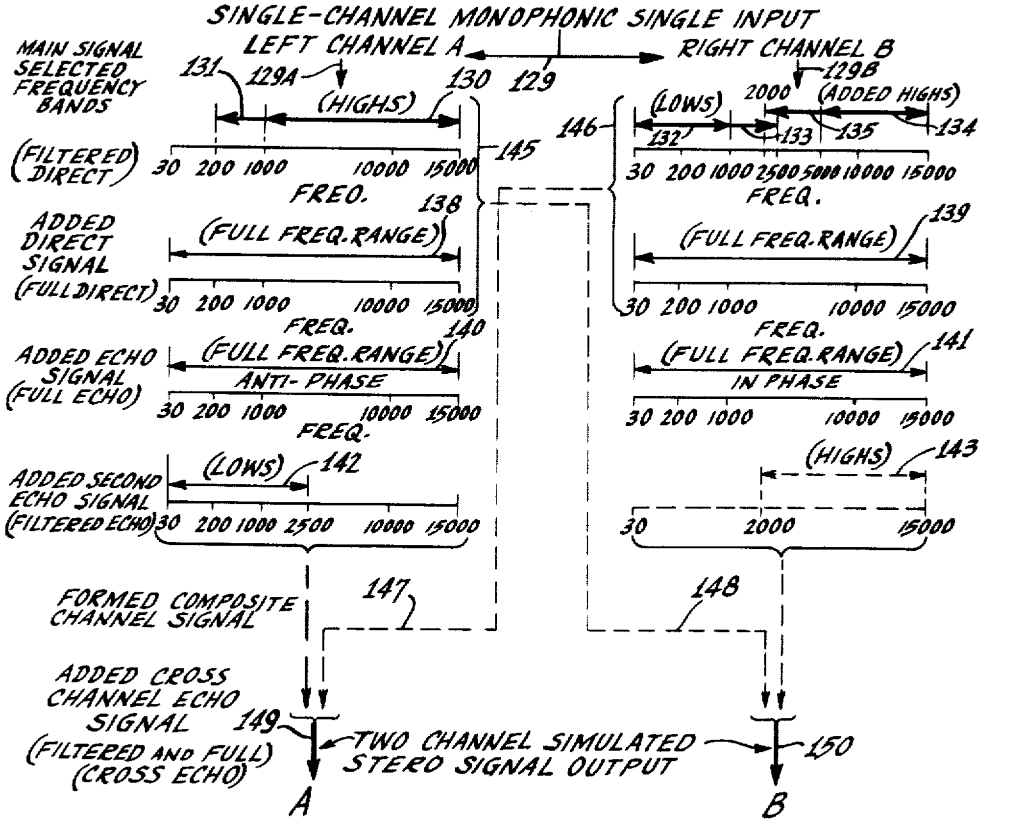
FIGURE 3 is a tabulation of the signal components in the signal output of the system of FIGURE 1, graphically illustrating the signal translating process as provided in accordance with the invention.

The composition of a simulated stereophonic signal which, by way of example, may be provided in the two-channel stereophonic signal output circuit as the result of an applied single-channel monophonic signal at the input circuit, in accordance with the invention, is shown graphically in FIGURE 3 to which attention is now directed, along with FIGURE 2 which shows the overall frequency response characteristics of the channel A and channel B output signals.

Referring first to FIGURE 2, a resultant frequency-response or characteristic curve 115, in solid line for the high-frequency channel A, and a similar curve 116A—116B, for the low frequency channel B, show that in channel A the frequency response may be relatively high in a band from any lower frequency, such as 200 cycles, to the upper end of the useful audio frequency spectrum, which may be selected to be 15,000 cycles, and is adjusted to fall off below the lower limit. As shown by the dotted low-frequency extension 117 of the curve 115, the low-frequency component of the channel A output signal may be made to fall off rapidly to zero below this lower limit. Further by way of example, the lower limit may be set at 1000 cycles, to follow the dotted-line curve extension 118 for channel A, or the frequency response above 1000 cycles may be boosted or raised, as indicated by the dotted curve line 119. A response curve 119—118—114 may thus be set up as one of many that are possible, if departure from the general response curve 115 is desired. The cut-off frequency from 1000 cycles, or higher, down to 200 cycles, or lower, for the high-frequency spectrum of channel A is determined by the filter element 58 in FIGURE 1, while the amplitude of the response characteristic and its shape is further controlled by attenuators 17 and 18.

For channel B, the solid-line response curve 116A—116B shows a falling off of the frequency response by way of example, between 1000 cycles and 5000 cycles. The response curve would normally follow the dotted curve portions 120 and 121. However the valley between the two portions of the curve 116 may be filled in by applying the full direct signal or by filter setting. The channel B response then is high from 30 cycles to a higher frequency, in a band, as provided by the filter element 59 of FIGURE 1. The high-frequency end of the curve may be provided with increased response in a second frequency band between a lower frequency, such as 2000 cycles or higher (5000 cycles), and the 15,000 cycle upper limit, by the filter element 60 of FIGURE 1. The relative amplitudes of the curve portions are determined by the setting of the attenuators 27, 30 and 32.

As explained also in connection with FIGURE 1, the low-frequency portion or band 116A of the curve 116 may be extended up to 2500 cycles or higher, as indicated by the dotted curve portion 122, and likewise the high-frequency portion or band 116B may be extended downwardly in frequency, to 2000 cycles, or lower, as indicated by the dotted curve portion 123. In this case, the curve 116 becomes two overlapping curves which may be designated as 124—123 and 125—122, for example.

As explained hereinbefore, the basic signal elements are controlled and proportioned, generally by subjective listening to the overall resultant simulated stereophonic signal derived from the recording means 10, or from the output circuit 8—9 by suitable monitoring means (not shown), connected as indicated in the circuit of FIGURE 1. In this way the applied monophonic signal or recording may effectively be duplicated in stereophonic form. The filter means serve to establish a pattern of signals (band-widths) whose levels are changed (by the attenuators) to accomplish the desired stereo effect. As explained hereinbefore, it is found that the filter settings or band widths on the direct signal and the attenuator or level settings, are effective to separate or localize the left and right hand, or channels A and B, sound sources present in the original recording of the monophonic signal. The level settings of the filtered signals, however, mainly determine the localization of the different sound sources in the output signals. These are attenuators 18, 30 and 32 in the circuit of FIGURE 1.

The filter settings or response characteristics on echo signals are made to present the fullest sound spectrum without reducing the localization of desired sound sources. In the present example this concerns the bandwidth of the filter element 93 of the circuit of FIGURE 1 and the level settings of the echo signal through the attenuators 19, 20 and 31, which are such as to keep the sound picture broad but not to interfere with the localization of desired sounds or to introduce overly reverberant sound into either output channel.

Preferably, in lieu of the attenuator 20, which may be closed off, the magntude and composition of the echo signals may be controlled by the cross-echo components through the attenuators 111 and 112, and 106, 107 and 108, together with the level setting attenuators 103 and 104. In any case, as hereinbefore explained, the spatial effect is increased by the added echo signal components so that the reverberation may be substantially equal to that of a direct stereophonic recording.

Referring to the tabulation in FIGURE 3, it will be seen that, in the present example, the single-channel monophonic signal input 129 is divided into left and right channel signals 129A and 129B, respectively, composed as follows:

(1) Main signals in selected frequency bands are added to both channels. In the left channel A, a high-frequency band indicated by the arrowed line 130 extends from 1000 to 15,000 cycles, with a possible low frequency extension, as indicated by the arrowed extension line 131, down to 200 cycles. In the right channel B, a low-frequency band indicated by the arrowed line 132, extends from 1000 cycles down to 30 cycles, and may be extended upwardly, as indicated by the arrowed extension line 133, to 2500 cycles. An additional channel balancing high-frequency band, indicated by the arrowed line 134, extending from 5000 cycles to 15,000 cycles may be added to the right channel B. This may likewise be extended, as indicated by the arrowed line 135, down to 2000 cycles.

To these filtered direct main signal components are added direct full-frequency signals in both channels. These may be varied in amplitude like the main signals and are indicated by the arrowed lines 138 and 139. The applied full direct signals serve to raise the levels of the response characteristics shown in FIGURE 2.

The full echo signal added to each signal channel is indicated by the arrowed lines 140 and 141, and the second echo signal added to the left channel is indicated by the arrowed line 142. This is shown as covering a frequency range of 30 to 2500 cycles in the present example, as provided by the filter element 93 in FIGURE 1. In a similar manner, a high-frequency signal band, indicated by the dotted arrowed line 143, may be added to the right channel B signal. However, as explained in connection with the circuit of FIGURE 1, preferably the cross echo signals may be added and may comprise various signal components in any desired amplitude relation to affect the same or more realistic results. The addition of cross-echo signals to both channel output circuits is represented by the dotted bracket elements 145 and 146 and their arrowed connection lines 147 and 148, respectively. These show the cross echo arrangement graphically as provided by the circuit of FIGURE 1.

Referring again to FIGURE 1, it will be seen that for the left channel cross-echo A signal supply to the right channel B, corresponding to the bracket 145 and the line 148, the attenuators 111 and 112 are adjusted to pick up the full-direct and high-frequency band of signals from the supply circuits 35 and 36 to produce the desired reverberation signal effect in the right channel B, and the amplitude of the applied resultant echo signal is controlled by the output attenuator 104.

Likewise the attenuators 106, 107 and 108 are adjusted to control the application of signal components represented by the arrowed lines 132, 139 and 134, respectively, of the right channel B signal of FIGURE 3. This operation is represented in FIGURE 3 graphically by the bracket 146 and the arrowed line 147 over into channel A, and the amplitude of the applied resultant echo signal is controlled by the output attenuator 103.

The overall result is a two-channel simulated stereophonic signal output for channels A and B as indicated by the arrowed signal components 149 and 150 in FIGURE 3. The left and right channel signal composition above-described is shown only by way of example, and may be varied to derive a simulated stereophonic signal output from any applied monophonic signal in accordance with the analysis of the composition of the original recording and its original signal sources. The present frequency assignment and allocation is adapted particularly for the simulated stereophonic recording and reproduction of orchestral and choral music from original monophonic sources or recordings.

In any case however it will be seen that the sound translating and recording system of the present invention includes simplified circuits and circuit elements combined to first divide the overall frequency spectrum of the original signal by filtering, to effect sound localization and channel separation. Second, the frequency spectrum of each separate channel signal is controlled or shaped by added direct and echo signal components to provide enhanced sound localization and realism. The added direct signals and echo signals also replace in each channel, at any desired reduced or increased level, any frequency componets or frequency bands previously filtered out, so that neither channel signal output sounds tonally incomplete. The echo signal components and reverberation increase the spatial effect and broaden the sound picture to substantially equal that of a direct stereophonic recording.

What is claimed is:

1. A system for translating monophonic sound signals into two-channel simulated stereophonic sound signals, comprising in combination, a signal input circuit, two signal output circuits, a circuit network connected with said input circuit to divide an input signal therefrom into two separate channel signals, filter means having different frequency spectrums for applying said separate channel signals from said circuit network to said output circuits in simulated stereophonic relation, means for applying the full frequency range of said separate channel signals from said circuit network to each of said output circuits to replace filtered-out signal components, means for deriving and applying full-frequency echo signals from said input signal to said output circuits, means for deriving and applying cross-echo signals from the filtered and full frequency range signals in each of the separate channels to the opposite channel output circuit, and means for variably attenuating said applied signals to control the relative amplitudes thereof at said output circuits and the simulated stereophonic sound characteristics of the resultant composite output signals therefrom.

2. A system for translating monophonic sound signals into two-channel simulated stereophonic sound signals, comprising in combination, a signal input circuit, two signal output circuits, means including signal dividing circuits connected between said input circuit and each of said output circuits for deriving and translating direct signal components of an input monophonic signal having differing amplitude versus frequency characteristics and mixing said components at controlled levels into said output circuits, and means connected between said input circuit and each of said output circuits for deriving and translating selected reverberation signal components of said input signal and mixing said components at controlled levels into said output circuits with said direct signal components, to provide composite output signals from said system in simulated stereophonic relation.

3. A system for translating monophonic sound signals into simulated stereophonic sound signals for recording and reproduction in stereophonic form, comprising in combination, a single-channel signal input circuit, simulated stereophonic left and right channel signal output circuits, means connected with said input circuit for dividing an applied sound signal into components in two different frequency bands, means for applying the divided frequency components one to each of said output circuits in controlled amplitudes, means connected with said input circuit for deriving echo signal components from said applied signal, and means for applying said echo signal components to said output circuits in controlled amplitudes, thereby to provide composite simulated stereophonically related signals in said output circuits.

4. A system for translating monophonic sound signals into simulated stereophonic sound signals for recording and reproduction in stereophonic form, comprising in combination, a single-channel signal input circuit, a simulated stereophonic left-channel signal output circuit, a simulated stereophonic right-channel signal output circuit, means connected with said input circuit for dividing an applied sound signal into relative high and low frequency components in two different frequency bands, means for applying the divided frequency components one to each of said output circuits in controlled amplitudes, means connected with said input circuit for deriving echo signal components from said applied signal, means for applying one of said echo signal components in-phase to one output circuit and out-of-phase to the other output circuit in controlled amplitudes, and means connected with said input circuit for conveying said applied signal in controlled amplitudes to each of said output circuits, thereby to provide composite simulated stereophonically-related sound signals in said output circuits.

5. A system for translating monophonic sound signals into two-channel simulated stereophonic sound signals, comprising in combination, a monophonic signal input circuit, a simulated stereophonic left-channel signal output circuit, a simulated stereophonic right-channel signal output circuit, filter means connected for translating signals from said input circuit to said right-channel output circuit in a main relatively lower frequency band, filter means connected for translating signals from said input circuit to the left-channel output circuit in a different and relatively higher frequency band, thereby to provide effective stereophonic signal division of an applied monophonic input signal for simulated two-channel stereophonic signal output therefrom, means for controlling the relative amplitudes of said translated signals, means for deriving and translating different echo signal components from said input signal into said output circuits for combining with said first named signals, and means for controlling the relative amplitudes of said echo signal components applied to said output circuits and the reverberation characteristics of said signal output.

6. A system for translating monophonic sound signals into two-channel simulated stereophonic sound signals, comprising in combination, a single-channel signal input circuit, a simulated stereophonic left-channel signal output circuit, a simulated stereophonic right-channel signal output circuit, filter means connected for translating signals from said input circuit to said right-channel output circuit in a main low-frequency band and a higher supplemental frequency band, filter means connected for translating signals from said input circuit to the left-channel output circuit in a different and relatively higher frequency band, thereby to provide an effective stereophonic signal division of an applied monophonic input signal for simulated two-channel stereophonic signal output from said system, and means connected between said input circuit and said output circuits for deriving from said input circuit and applying to said output circuits selected direct and echo signal components, thereby to enhance the stereophonic signal output from said system.

7. A sound translating system as defined in claim 6, wherein certain of the selected echo signal components applied to said output circuits by said last named means are in-phase with other signal components in one output circuit and out-of-phase therewith in the other output circuit.

8. A signal translating system for translating monophonic sound signals into two-channel simulated stereophonic sound signals, comprising in combination, a single-channel monophonic signal input circuit, a pair of signal output circuits, signal translating means including filter means having different relatively-wide frequency pass-band characteristics connected between said input circuit and each of said output circuits to divide the overall frequency spectrum of an applied input signal for sound source localization and channel separation, signal translating means connected between said input circuit and each of said output circuits for adding direct signal components from said input circuit to each of said output circuits to control and shape the frequency spectrum of the output signals from said system, and means for adding reverberation signal components to each of said output circuits from the input circuit including reverberating signal deriving elements connected between said input circuits and each of said output circuits.

9. A signal translating system for translating monophonic sound signals into two-channel simulated sound signals, comprising in combination, a monophonic signal input circuit, a pair of signal output circuits, means providing a plurality of direct signal conveying circuits between said input circuit and each of said output circuits, one circuit to each output circuit including band-pass filter means, said band-pass filter means having different pass-band characteristics for dividing the frequency spectrum of an input signal into different frequency bands for effective signal channel separation, means providing echo signal deriving and conveying circuits between said input circuit and each of said output circuits, and signal attenuator means in said signal conveying circuits for controlling the relative amplitudes of the direct and echo signal components in said output circuits.

10. A system for translating monophonic signals into two-channel simulated stereophonic sound signals, comprising in combination a signal input circuit, two signal output circuits, means including signal dividing circuits connected between said input circuit and each of said output circuits for deriving and translating different selected direct signal components from an input monophonic signal and mixing into said output circuits to provide two output signals in simulated stereophonic relation therein, signal attenuator means connected with said translating means for controlling the relative amplitudes of said signal components in said output circuits and the balance of said output signals, means connected between said input circuit and each of said output circuits for deriving and translating different echo-signal components from said input monophonic signal into said output circuits and combining with said direct signal components to enhance the sound characteristics and balance of said output signals, and signal attenuator means connected with said echo-signal translating means for controlling the relative amplitudes of said echo signal components in said output circuits and the reverberation characteristics of said output signals.

11. A sound signal translating and recording system, comprising in combination, a single-channel signal input circuit, a pair of signal output circuits, a signal mixer network connected with each of said output circuits for translating signals thereto, means providing a direct signal conveying circuit connection between said input circuit and each of said mixer networks for applying direct signals therethrough to each of said output circuits, means including an acoustic echo chamber providing a reverberation signal conveying connection between said input circuit and each of said mixer networks for applying echo signals therethrough to each of said output circuits, means providing a second direct signal conveying circuit connection between said input circuit and each of said mixer networks, filter means in each of said last-named circuit connections having different wide-band frequency characteristics, and signal attenuator means interposed in each of said signal conveying connections preceding said mixer networks, thereby to provide composite signals which simulate stereophonically-related signals in said output circuits in response to an applied monophonic signal at said input circuit.

12. A simulated stereophonic sound translating and recording system comprising in combination, a single-channel monophonic signal input circuit for connection with monophonic sound signal translating means, a two-channel pair of signal output circuits for connection with sound recording means, means providing a high-pass signal-conveying connection between said input circuit and one of said output circuits, means providing a low-pass signal-conveying connection between said input circuit and the other of said output circuits, thereby to effect a simulated stereophonic channel separation in the signal output from said system in response to an applied wide-range input signal, means providing a second high-pass signal-conveying connection between the input circuit and said other output signal circuit, thereby to effect a balance in the frequency response of said other output circuit, means providing reverberation signal deriving and conveying connections between said input circuit and each of said output circuits, said last named means including at least one acoustic echo chamber, and signal attenuator means in at least one of said signal conveying connections.

13. A signal translating system for effective duplication of monophonic single-channel signals in simulated stereophonic two-channel form, comprising in combination, a single-channel monophonic sound signal input circuit, a pair of sound signal output circuits, means connected between said input circuit and each of said output circuits for deriving and applying a simulated stereophonic channel signal from the input circuit to each of said output circuits in different frequency ranges in response to an applied wide-range monophonic signal at said input circuit, means connected between said input circuit and each of said output circuits for applying direct signals from said input circuit to each of said output circuits at controlled amplitudes, means connected between said input circuit and each of said output circuits for applying to said output circuits a substantially full-frequency echo signal, said last named means including an acoustic echo chamber connected to said input circuit for receiving a monophonic signal therefrom and having a controlled signal output connection with each of said signal output circuits, and means including a band-pass filter providing a second signal output connection for said echo chamber with one of said output circuits.

14. A signal translating system for effective duplication of monophonic single-channel sound signals into simulated stereophonic two-channel form, comprising in combination, a monophonic signal input circuit, a pair of signal output circuits, means providing a plurality of direct signal conveying circuits between said input circuit and each of said output circuits, one direct signal conveying circuit to each output circuit including wide frequency band filter means, said filter means having different pass-band characteristics for dividing the frequency spectrum of an input signal into different frequency bands for effective signal channel separation, means providing cross and direct echo signal conveying circuits between said input circuit and each of said output circuits, a relatively large main echo chamber connected with two of said echo signal conveying circuits as a common direct echo signal deriving means therefor, and a relatively smaller echo chamber connected with each of two others of said echo signal conveying circuits as individual cross-echo signal deriving means therefor.

15. A signal translating system comprising the combination of a signal input circuit, a pair of signal output circuits, first means coupling said signal input circuit to said signal output circuits so that the frequency range of the signals applied to one of said output circuits is different from the frequency range of the signals applied to the other of said output circuits, and second means coupling said input circuit to said output circuits for applying substantially full frequency range signals to each of said output circuits.

16. A signal translating system comprising the combination of a signal input circuit, a pair of signal output circuits, a mixer circuit coupled to each of said signal output circuits, a plurality of variable attenuation means coupled to each of said mixer circuits, means for coupling said signal input circuit to one of the variable attenuation means connected to the mixer circuit for one of said output circuits for applying thereto signals in a first limited frequency range, means coupling said signal input circuit to one of the variable attenuation means connected to the mixer circuit for the other of said signal output circuits for applying thereto signals in a second and different limited frequency range, means coupling said input circuit to another of the attenuation means connected to the mixer circuit for said one signal output circuit for applying substantially full frequency range signals thereto, and means coupling said signal input circuit to another of the attenuation means connected to the mixer circuit for the other of said signal output circuits for applying thereto substantially full frequency range signals.

17. A signal translating system comprising in combination, a signal input circuit, a pair of signal output circuits, a high pass filter coupling said signal input circuit to one of said signal output circuits, a low pass filter coupling said signal input circuit to the other of said signal output circuits, means for applying substantially full frequency range signals from said input circuit to said pair of signal output circuits, and means for variably attenuating the signals applied to said pair of signal circuits.

18. A signal translating system comprising in combination, a signal input circuit, a pair of signal output circuits, a high pass filter coupling said signal input circuit to one of said signal output circuits, a low pass filter coupling said signal input circuit to the other of said signal output circuits, a high pass filter coupling said signal input circuit to the other of said signal output circuits, means for applying substantially full frequency range signals from said input circuit to said pair of signal output circuits, and means for variably attenuating the signals applied to said pair of signal output circuits.

19. A signal translating system for translating monophonic sound signals into two-channel simulated sound signals, comprising in combination, a monophonic signal input circuit, a pair of signal output circuits, means providing a plurality of direct signal conveying circuits between said input circuit and each of said output circuits, one circuit to each output circuit including band-pass filter means, said band-pass filter means having different pass-band characteristics for dividing the frequency spectrum of an input signal into different frequency bands for effective signal channel separation.

References Cited in the file of this patent

UNITED STATES PATENTS

| | | |
|---|---|---|
| 2,343,471 | Nixon | Mar. 7, 1944 |
| 2,403,232 | Parisier | July 2, 1946 |
| 2,852,604 | MacCutcheon | Sept. 16, 1958 |

UNITED STATES PATENT OFFICE

CERTIFICATE OF CORRECTION

Patent No. 3,087,988 April 30, 1963

Jack A. Somer

It is hereby certified that error appears in the above numbered patent requiring correction and that the said Letters Patent should read as corrected below.

Column 14, line 40, strike out "two-channel" and insert the same after "with" in line 41, same column 14; column 16, line 18, after "signal" insert -- output --.

Signed and sealed this 10th day of December 1963.

(SEAL)
Attest:
ERNEST W. SWIDER

Attesting Officer

EDWIN L. REYNOLDS

Acting Commissioner of Patents